Jan. 13, 1970  J. M. JACOBS, JR  3,488,871
SLIDE VIEWER
Filed Dec. 23, 1966
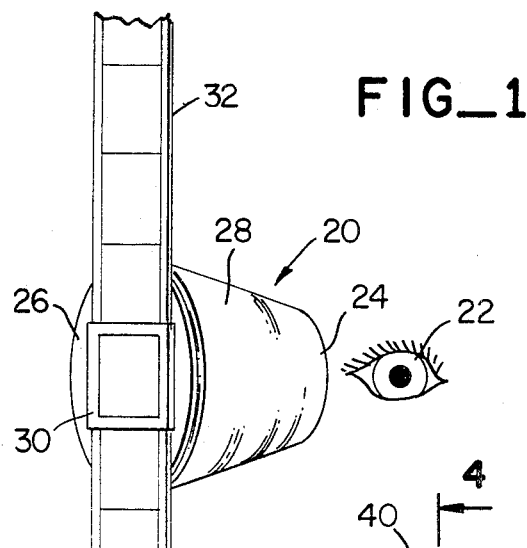
FIG_1
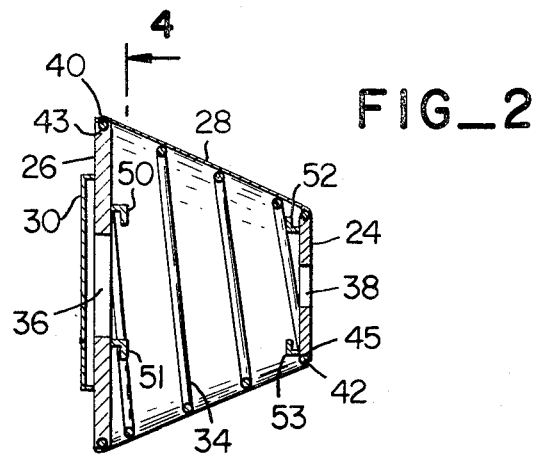
FIG_2
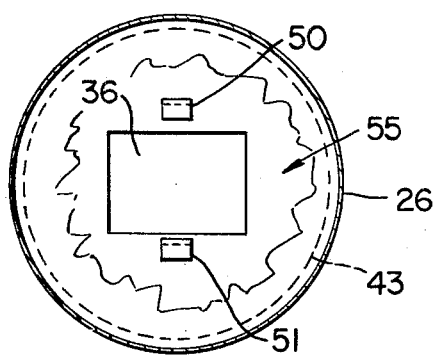
FIG_4
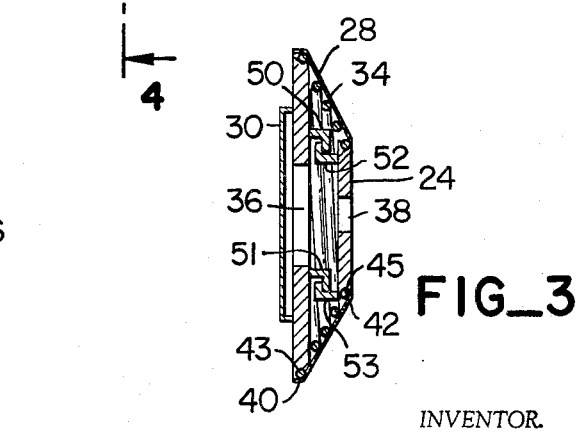
FIG_3
INVENTOR.
JUSTIN M. JACOBS, JR.
BY
*Edward Keeling*
ATTORNEY 3,488,871
SLIDE VIEWER
Justin M. Jacobs, Jr., 500 Sansome St., Suite 501,
San Francisco, Calif. 94111
Filed Dec. 23, 1966, Ser. No. 604,249
Int. Cl. G09f 11/18
U.S. Cl. 40—63                              1 Claim

ABSTRACT OF THE DISCLOSURE

A collapsible viewer which is held in an extended position by resilient means and which may be collapsed into a flat compact form for storage.

---

This invention relates to a slide viewer and more particularly this invention relates to a collapsible viewer for use in viewing transparent slides and the like. Still more particularly this invention relates to a collapsible slide viewer which is held in an expanded position by resilient means for viewing slides and which viewer is readily collapsed to form a thin, flat and compact form suitable for storage or mailing.

Heretofore attention has been given to collapsible slide viewers. For example, two forms of collapsible viewers are shown in U.S. Patents 1,655,989 and 2,789,460. The advantages to be gained by making the viewer collapsible are particularly important when storage or mailing are a consideration. The prior art viewers as evidenced above, however, have not solved the problem of providing an attractive, easily openable viewer while still retaining the advantages of the completely collapsible viewer.

In a broad aspect the present invention provides apparatus for viewing transparencies or slides and includes a base plate having a light receiving opening formed therein and slide holding means for holding a transparent slide adjacent the light receiving opening. The light receiving opening is sized to accommodate the desired size of transparency. A viewing plate also having an opening is connected in spaced-apart relationship with the base plate by suitable resilient means. The resilient means is depressible to allow the base plate and the viewing plate to come together to form a thin compact form. A collapsible bellows closes the space between the spaced-apart plates to form a viewing chamber in the closed space between the plates. The bellows is collapsed when the resilient means is depressed, bringing the plates together.

In a more special aspect of the invention a helical spring connects a base plate and a viewing plate. When expanded, the base plate and viewing plate are held in predetermined spaced-apart parallel plane relationship. The helical spring may be compressed to allow the two plates to come together to form a thin compact form. A pliable cover is formed snugly around the expanded helical spring and is connected to the base plate and the viewing plate, and forms, with the plates, a viewing chamber. The cover may be translucent to permit entry of enough light to form a soft glow in the viewing chamber. When a translucent cover is used a secondary image may be formed in the interior of the chamber and preferably against the interior wall of the base plate to give a suitable background for the slides which are to be viewed. Suitable lock means may also be provided to releasably lock the plates in adjacent compact position.

It is a principal object of the present invention to provide an attractive collapsible viewer which is held in expanded position by resilient means and which may be closed to form a compact thin form and later opened to viewing position.

Further objects and advantages of the present invention will become apparent from the following detailed description read in light of the accompanying drawing which is a part of this specification and in which:

FIG. 1 is a perspective view illustrating the preferred embodiment of apparatus assembled in accordance with the invention;

FIG. 2 is a longitudinal sectional view of the preferred apparatus of the invention in an expanded position;

FIG. 3 is a longitudinal sectional view of the preferred apparatus of the invention in a contracted position;

FIG. 4 is a sectional view taken at line 4—4 of FIG. 2.

Refer now to the drawings and to FIG. 1 in particular where the preferred embodiment of apparatus assembled in accordance with the invention is shown in perspective view. The slide viewing apparatus is generally indicated by the numeral 20. The viewer 20 is in expanded form and is ready for use by a person who is schematically indicated by an eye 22 looking into an eye opening of a viewing plate 24. The viewing plate 24 forms the viewing end of the viewer 20. A base plate 26 is held in spaced apart relationship from the viewing plate 24. The space between the plates 24 and 26 is enclosed by a bellows means 28. The bellows means 28 and the plates 24 and 26 cooperate to form a viewing chamber. Slide holding means 30 are provided on the base plate 26. The slide holding means 30 are adapted to hold a suitable slide in viewing position adjacent the view opening of the base plate 26. A slide strip 32 is one form of a slide useful with the present invention.

A longitudinal sectional view of the preferred embodiment of apparatus is shown in FIG. 2. As is more clearly illustrated in this view the base plate 26 and the viewing plate 24 are held in spaced apart relationship by suitable resilient means such as helical spring 34. The slide holding means 30 which is connected to the base plate has an opaque backing and is attached adjacent the view opening 36 of the base plate 26. The helical spring cooperates with the bellows means 28 to align the view opening 36 of the base plate 26 in light registering position with an eye opening 38 of the viewing plate 24. The eye opening is fitted with a suitable lens for use in viewing slides and the two plates 24 and 26 are spaced apart a distance equal to the focal length of the lens. The viewing plate 24 is sized to fit the eye cavity of the skull for easy and comfortable viewing. Thus a thin cylindrical viewing plate 24 having a diameter of between about 1 to 2 inches is preferred. A viewing plate 24 with a diameter of about 1½ inches has been found extremely satisfactory. An eye opening 38 of about ¼ to ½ inch has been found satisfactory.

The helical spring 34 is preferably over about two inches in length when expanded to thus cooperate with the bellows means 28 to space apart plates 24 and 26 about 2 inches. The helical spring has a diameter at its large end 40 suitable for attaching to the base plate 26. The diameter of the spring at its small end 42 is suitable for connecting to the viewing plate 24. A preferred means for connecting the spring 34 to the plates 24 and 26 is illustrated in FIG. 2. As there shown with respect to the base plate 26, for example, an annular groove 43 is formed in the peripheral wall of the cylindrical base plate 26. The large end 40 of the spring is sized to snap around and into the groove 43 of the base plate 26. In a similar manner a groove 45 is formed in the viewing plate and the small end 42 of the spring 34 is adapted to snap into it.

The bellows means 28 is connected in light tight relationship to the base plate 26 and the viewing plate 24 to form a viewing chamber interiorly of spring 34. A particular aspect of the present invention is to form the bellows means 28 of translucent material which will permit the passage of a soft glow of light into the viewing chamber. When such a soft glow is present in the viewing chamber a secondary image such as indicated by the numeral 55 in FIG. 4, may be formed in the viewing chamber and preferably on the interior of the base plate 26 to complement the slide image. A colored lightweight silk, synthetic cloth or synthetic film is preferred for this type of cover. Stretchable cloth or thin rubber film is useful as a cover material. The cover is sized to fit snugly around the helical spring when the spring is in the expanded position. This gives the viewer an attractive form and appearance.

The manner in which the viewing apparatus is collapsed and retained in a compact position can be understood more fully by referring to FIG. 3 in conjunction with FIG. 2. FIG. 3 is a longitudinal sectional view of the preferred embodiment of apparatus in a contracted position. In accordance with one form of the invention coupling means such as interlocking tines are used to retain the viewer in the contracted position. Thus tines 50 and 51 are formed on the interior of the base plate 26 and cooperating tines 52 and 53 are formed on the interior of the viewing plate 24. The tines 50 and 52 and 51 and 53 respectively are in line when the spring 34 is expanded and in a normal position. When it is desired to close and lock the viewer in a contracted position the plates 26 and 24 are moved together after being slightly rotated with respect to one another so that interlocking of the tines can occur when the two contracted plates 26 and 24 are rotated back into the normal position. The spring 34 keeps the tines from becoming disengaged. When it is desired to open the view only a slight twist on the plates is required to disengage the tines. Other means for retaining the viewer in collapsed position are also available. One such means is, for example, the use of well-known hook and pile fastening tapes. The hook tape is used to replace tines on one plate while the pile tapes are used to replace tines on the other plate.

The plates are pushed together to connect the tapes and pulled apart to release them.

Although only specific embodiments of apparatus have been described herein the present invention is meant to include all equivalents embraced within the appended claim.

I claim:
1. Apparatus for viewing slides comprising a base plate having a design on the interior thereof and a light receiving view opening formed therein; slide holding means on said base plate for holding a slide in viewing position adjacent to said view opening; a viewing plate having an eye opening formed therein; collapsible bellows means connected between said base plate and said viewing plate for forming a viewing chamber, said bellows means formed of translucent material to permit a limited amount of light to enter said chamber; and resilient means connected to said base plate and said viewing plate to normally hold said base plate and said viewing plate in spaced apart relationship to extend said bellows with the eye opening of said viewing plate in light registering position with the view opening of said base plate, said resilient means being depressible to allow said base plate and said viewing plate to be moved adjacent to one another to collapse said bellows.

References Cited

UNITED STATES PATENTS

| 47,382 | 4/1865 | Bausch | 350—250 |
| 1,221,836 | 4/1917 | Couden | 350—140 X |
| 1,487,173 | 3/1924 | Manion. | |
| 1,606,702 | 11/1926 | Heitzler. | |

FOREIGN PATENTS

| 25,036 | 1913 | Great Britain. |
| 832,932 | 4/1960 | Great Britain. |

EUGENE R. CAPOZIO, Primary Examiner

RICHARD CARTER, Assistant Examiner